(12) United States Patent
Brooks et al.

(10) Patent No.: US 8,464,078 B2
(45) Date of Patent: Jun. 11, 2013

(54) DELAY CIRCUIT WITH RESET FEATURE

(75) Inventors: Robert C. Brooks, Houston, TX (US);
Joseph A. Clegg, Spring, TX (US);
George F. Squibb, Spring, TX (US);
Robert S. Wright, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 12/812,483

(22) PCT Filed: Jan. 22, 2008

(86) PCT No.: PCT/US2008/051669
§ 371 (c)(1),
(2), (4) Date: Aug. 26, 2010

(87) PCT Pub. No.: WO2009/094019
PCT Pub. Date: Jul. 30, 2009

(65) Prior Publication Data
US 2011/0060926 A1   Mar. 10, 2011

(51) Int. Cl.
| G06F 1/00 | (2006.01) |
|---|---|
| G05F 5/00 | (2006.01) |
| B23K 11/24 | (2006.01) |
| H02H 9/00 | (2006.01) |
| H02H 3/00 | (2006.01) |
| H02M 7/00 | (2006.01) |
| H01R 12/00 | (2006.01) |
| H01R 29/00 | (2006.01) |

(52) U.S. Cl.
USPC ........... 713/300; 713/330; 713/340; 323/299; 323/318; 361/56; 361/83; 361/89; 361/94; 363/13; 439/63; 439/176

(58) Field of Classification Search
USPC ..... 713/300, 330, 340; 323/299, 318; 361/56, 361/83, 89, 94; 363/13; 439/63, 176
See application file for complete search history.

(56) References Cited

U.S. PATENT DOCUMENTS

| 4,631,470 | A | * | 12/1986 | Bingley | 323/282 |
|---|---|---|---|---|---|
| 4,907,118 | A | | 3/1990 | Hames | |
| 5,020,090 | A | | 5/1991 | Morris | |
| 5,864,457 | A | | 1/1999 | Kates et al. | |
| 6,035,214 | A | | 3/2000 | Henderson | |
| 7,019,954 | B2 | | 3/2006 | Manning et al. | |
| 7,392,410 | B2 | * | 6/2008 | Allen et al. | 713/310 |
| 7,804,257 | B2 | * | 9/2010 | Jia | 315/307 |
| 7,883,358 | B1 | * | 2/2011 | Chu et al. | 439/489 |
| 7,974,057 | B2 | * | 7/2011 | Schiene et al. | 361/58 |
| 2002/0080630 | A1 | * | 6/2002 | Hodge, Jr. | 363/50 |

FOREIGN PATENT DOCUMENTS

| DE | 696 32 880 T2 | 12/2004 |
|---|---|---|
| KR | 164144 B1 | 4/1999 |

OTHER PUBLICATIONS

HPDC, Office Action of Jul. 19, 2011, CN App. No. 200880125388, 12 p.

(Continued)

*Primary Examiner* — Stefan Stoynov

(57) ABSTRACT

A system comprises an AC/DC adapter having a connector. The system also comprises a portable computer that receives said connector. The portable computer comprising a delay circuit coupled to a power transistor that is coupled in parallel with a resistor. The delay circuit causes the power transistor to activate following a time delay after current from the adapter begins to flow through the resistor. As a result of a user beginning to remove the connector from the portable computer, a control transistor is activated to reset the delay circuit.

12 Claims, 2 Drawing Sheets

OTHER PUBLICATIONS

HPDC, Office Action of Nov. 18, 2011, DE App. No. 11 2008 003 629.2, 2 p.

T. Giesberts, "Remake of a Famous Amplifier," Crescendo Millennium Edition, Elektor Electronics, Apr. 2001, pp. 36-45.

Giesberts et al., Elektor (Elektronic & Computertechnik) Crescendo Millenium Edition, In: Elektor. ISSN 0932-5468. Apr. 2001, S. 16-25.

* cited by examiner

DELAY CIRCUIT WITH RESET FEATURE

BACKGROUND

Notebook computers typically have a rechargeable battery. The battery can be recharged and the notebook computer can be powered from an external alternating current (AC) power source by connecting an AC adapter to the notebook computer. The possibility exists that an inrush of current flowing from the AC adapter into the notebook computer upon connecting the AC adapter to the notebook may damage one or more components in the notebook. The current inrush may be substantially high, albeit short in duration, due to the combined capacitive effect from capacitors connected to the notebook's power rail. The excessively high inrush current may be harmful to various components such as a power transistor switch through which the current flows into the notebook's circuitry.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc.

DETAILED DESCRIPTION

Figure 1:
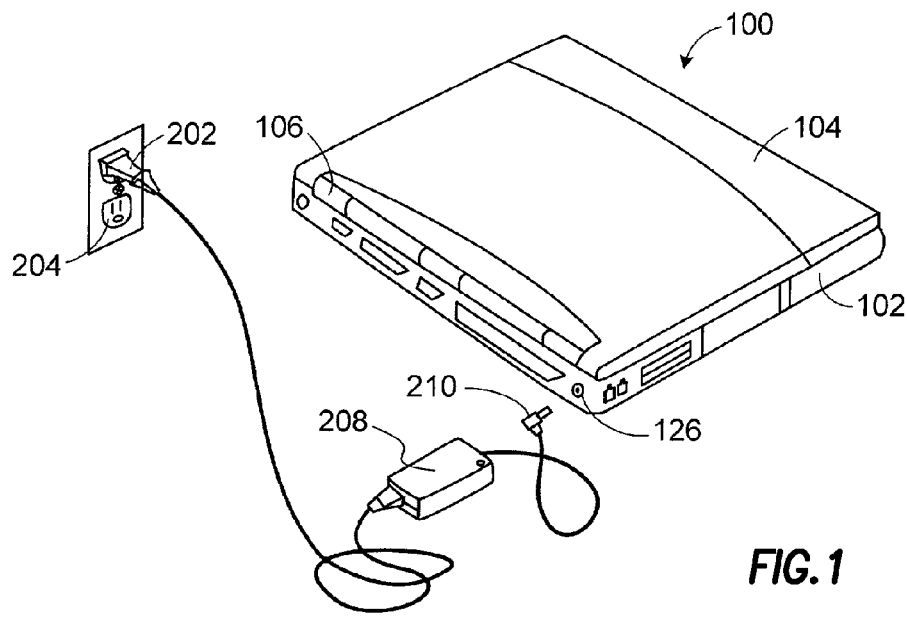
FIG. 1 shows a system in accordance with various embodiments.

FIG. 1 shows an embodiment of a notebook computer 100 in accordance with various embodiments. An AC adapter 208 receives AC voltage (e.g., 110 VAC) from a wall outlet 204 via a wall outlet plug 202. The AC adapter 208 converts the AC voltage to a suitable direct current (DC) voltage level (e.g., 19.5 VDC) for use by the computer 100. The AC adapter comprises an adapter plug 210 that is plugged into a corresponding power receptacle 126 on computer 100. The computer 100 comprises a main housing 102 and a display housing 104 that are pivotably coupled to one another by way of hinge 106. The main housing 102 comprises various components such as a motherboard on which various electronic devices (e.g., processor, memory, etc.) are mounted. The display housing 104 comprises a display (e.g., a liquid crystal display (LCD)).

Figure 2:
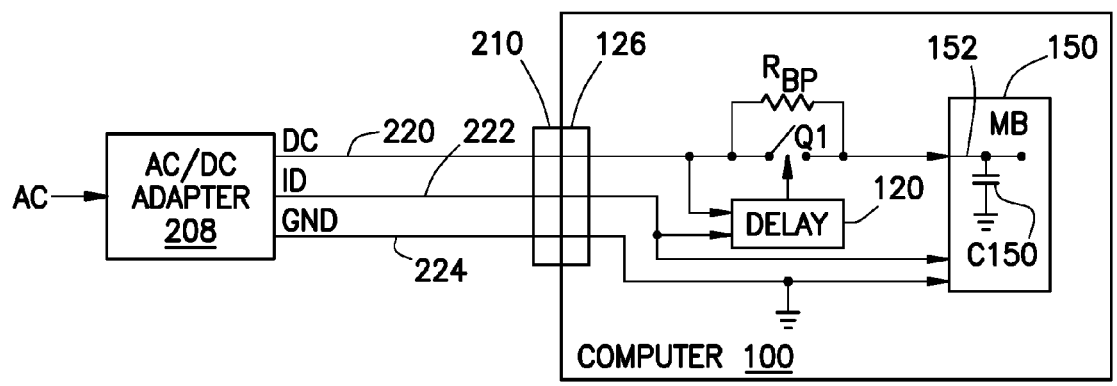
FIG. 2 shows a block diagram of the system of FIG. 1 including a delay circuit in accordance with various embodiments.

FIG. 2 illustrates a schematic block diagram of the AC adapter 208 and computer 100. The adapter 208 converts AC voltage to a DC voltage level. In accordance with at least some embodiments, the adapter 208 provides three conductors to the computer 100. The conductors comprise a DC voltage 220, an identifier (ID) signal 222, and a ground (GND) 224. Different or additional conductors can be provided as desired.

The adapter ID signal provides a voltage that indicates to the computer 100 the type of adapter that is connected thereto. The power rating of the adapter 208 should be sufficient for the given computer 100. The computer 100 can examine the voltage on the ID signal to determine the type of adapter. If, for example, the computer 100 is a 200 W computer but a user incorrectly connects a 75 W AC adapter to the computer, computer 100 detects this mismatch via the adapter's ID signal. As a result, the computer may prevent the adapter's voltage from reaching the motherboard (MB) 150 or may cause the computer to transition to a power state that comports with the power rating of the adapter 208. For more information about the ID signal, reference should be made to U.S. Pat. No. 7,028,202, incorporated herein by reference.

The computer 100 comprises a motherboard 150. The motherboard comprises at least one power rail 152 which provides DC operating voltage to the active electronic components on the board. One or more capacitors are coupled between the power rail and ground to filter the power rail voltage to thereby provide a suitable voltage level. The power rail capacitors are represented in FIG. 2 with the equivalent capacitance C150. The computer 100 also comprises a transistor switch Q1 coupled in parallel with a bypass resistor $R_{BP}$ as well as a delay circuit 120 controlled by the adapter ID signal on conductor 222. In some embodiments, $R_{BP}$ is 1.6 ohms, although the resistance can be different in other embodiments. A characteristic of a capacitor is that the instantaneous application of a voltage causes a large spike in current through the capacitor. Thus, as DC voltage from the adapter 2080 flows to the motherboard, capacitor C150 will begin to charge. The inrush of current due to the capacitor's characteristic noted above, however, may be large enough to damage transistor switch Q1 as well as possibly cause the adapter 208 to shut down. In accordance with various embodiments, when a voltage is received from an adapter 208, DC current flows from the adapter, through resistor $R_{BP}$, and to the motherboard and capacitor C150. The switch Q1 is forced to an open state so that no current can flow through the switch. The combination of $R_{BP}$ and C150 causes the current flow through C150 to rise at a controlled rate that is lower than the inrush current would otherwise be without the resistor $R_{BP}$. The delay circuit 120 causes the transistor switch Q1 to close after a time delay that is built in to the delay circuit. The time delay of the delay circuit is sufficiently large that capacitor C150 will already have charged by the time switch Q1 is caused to close. Once Q1 closes, current flows from the adapter, through Q1 instead of $R_{BP}$, and to the motherboard 150. Because C150 will have already charged (or at least substantially so) by the time Q1 closes, a damaging inrush of current is not created.

Figure 3:
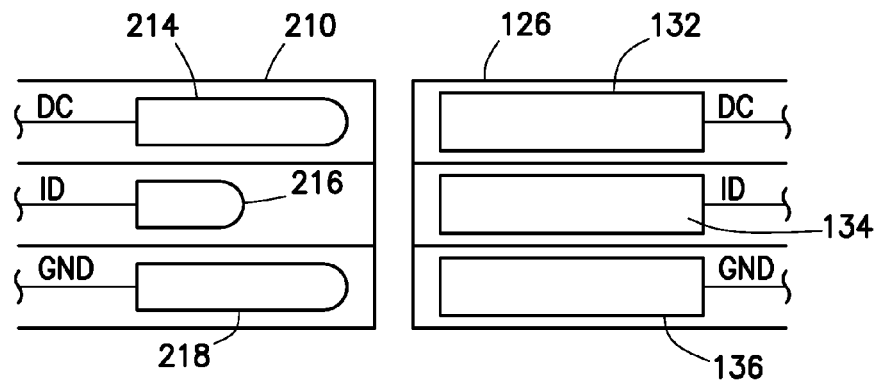
FIG. 3 shows an illustrative schematic of mating connectors usable in conjunction with the system of FIGS. 1 and 2.

FIG. 3 illustrates an embodiment of adapter plug 210 (connected to the adapter) and power receptacle 126 provided on the computer 100. In the illustrative embodiment, each connector has three pins 214, 216, and 218—one pin for each of the DC, ID and GND conductors, respectively, noted above. The ID pin 216 does not extend as far as (e.g., is shorter than) the DC and GND pins 214 and 218. The power receptacle 126 includes three receptacles 132, 134, and 136—each to receive a corresponding one of the pins 214, 216, and 218 from the adapter plug 210. When the adapter plug 210 is mated to the power receptacle 126, the DC and ground pins 214 and 216 mate to their corresponding receptacles 132 and 136 before the ID pin 216 mates to its corresponding receptacle 134. Thus, the pin 216 carrying the adapter ID signal 222 "makes last" and "breaks first." This means that, upon mating the adapter plug 210 to power receptacle 126, the adapter ID's pin 216 establishes connectivity with the corresponding receptacle 134 on the computer's power receptacle 126 after the other pins (DC and GND pins 214, 218) establish connectivity. In this partial mating situation (DC and GND pins 220, 224 are mated to their corresponding sockets 132, 136, but ID pin 216 is not connected to its socket 134), DC and GND potentials are provided through power receptacle 126 to the computer 100.

Upon disconnecting the adapter plug 210 from power receptacle 126, the adapter's ID pin 216 breaks its connectivity (disconnects) before the other two pins 214, 218 (partial disconnect). The nature of the ID signal and its pin 216 in this regard is used to rapidly reset the delay circuit 120 as will be explained below. Without this rapid reset capability, the delay circuit 120 may not reset quickly enough relative to a user that quickly disconnects, and then reconnects the adapter plug 210. Reconnecting the adapter plug 210 to the computer 100 before the delay circuit 120 has reset may find the switch Q1 still in the closed state thereby possibly causing a current inrush problem that the switch Q1 and delay circuit 120 were otherwise intended to ameliorate.

Figure 4:
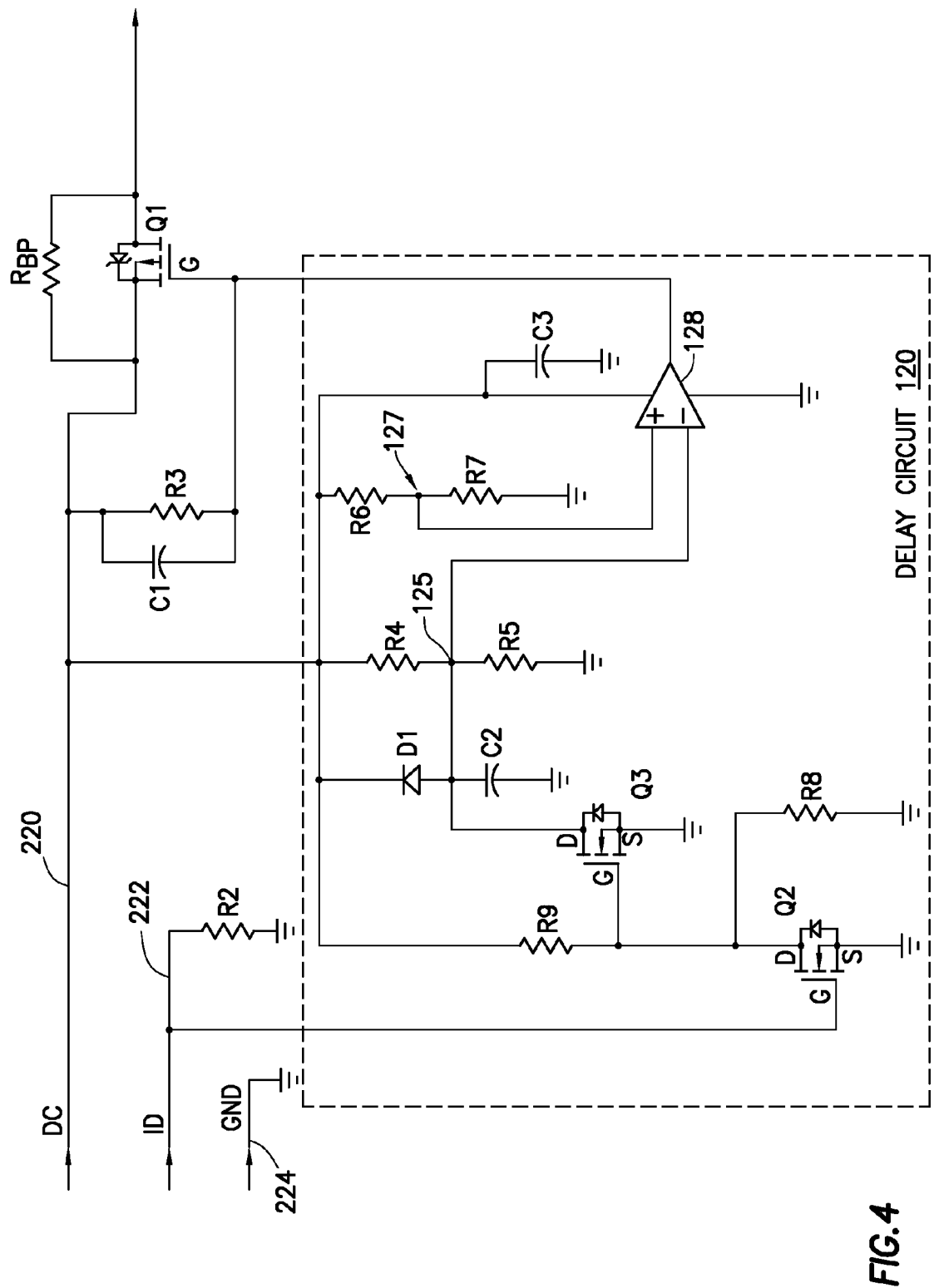
FIG. 4 shows a schematic of the delay circuit of FIG. 2 in accordance with various embodiments.

FIG. 4 shows an illustrative embodiment of the delay circuit 120 as well as the parallel combination of resistor $R_{BP}$ and transistor switch Q1, resistors R2 and R3 and capacitor C1. The delay circuit 120 comprises transistor switches Q2 and Q3, diode D1, operational amplifier (op amp) comparator 128, capacitors C2 and C3, and resistors R4-R9.

Power is provided to the delay circuit 120 from the DC voltage line 220 when the AC adapter's adapter plug 210 is mated to the computer's power receptacle 126. DC voltage is supplied to the delay circuit once at least the DC and GND pins 214, 218 are mated to their respective sockets 132, 136 (FIG. 3), even if the ID pin 216 has not yet mated to its corresponding socket 134.

Transistors Q2 and Q3 are NPN transistors and, accordingly, transistors Q2 and Q3 are turned on when their gates are at a high logic level. The ID signal line 222 is coupled to the gate (G) of transistor Q2. Resistor R2 is coupled to the ID signal line 222 and pulls the ID signal low when the adapter plug 210 is not connected thereto. In the adapter, a resistor couples the ID signal in some embodiments to the DC voltage line 220. Thus, when the adapter plug 210 is connected to the power receptacle 126, the ID line becomes a logic level substantially higher than the GND level. When the ID pin 216 is not connected to socket 134 but DC and GND pins 220, 224 are connected to sockets 132, 136 (i.e., partial mating of the plug 210) the gate of Q2 is low (via pull-down resistor R2) thereby causing Q2 to be off. With Q2 off, resistors R9 and R8 function as a voltage divider to divide down the DC voltage 220 to the gate of transistor Q3. Accordingly, Q3 is turned on. Thus, when the adapter plug 210 is partially mated to the power receptacle 126, transistor Q2 is off and transistor Q3 is on.

When the user fully mates the adapter plug 210 with power receptacle 126 (ID pin 216 mates to socket 134), the gate of transistor Q2 becomes high thereby turning on Q2. With the source of Q2 connected to ground, the gate of Q3, which couples to the drain of Q2, becomes low thereby turning off Q3.

When a user partially disconnects the adapter plug 210 from power receptacle 126, the ID signal disconnects before the DC and GND lines as discussed above. In the partial disconnect state, the gate of Q2 becomes low thereby turning off Q2. The gate of Q3 becomes high thereby turning on Q3.

Referring still FIG. 4, when transistor Q3 is off (partial mating of plug 210), resistors R4 and R5 function as a voltage divider between the DC voltage 220 and GND. When Q3 is on, the voltage on node 125 is forced to a level of approximately 0.7 V (low) because the source (S) of Q3 (and thus Q3's drain as well) is connected to GND. The node 125 between resistors R4 and R5 couples to the inverting (−) input terminal of the comparator 128. Without regard to whether Q3 is on or off, the resistors R6 and R7 function as a voltage divider between the DC voltage 220 and GND. The node 127 between resistors R6 and R7 couples to the non-inverting (+) input terminal of the comparator 128. In at least some embodiments, the resistance values of R4-R7 are such that the voltage on node 125 is greater than the voltage on node 127 when Q3 is off. In some embodiments, resistors R4-R7 have resistance values of 73.2 kohms, 13.7 kohms, 90.9 kohms, and 10.7 kohms, respectively. As result, the voltage on node 125 (when Q3 is off) is approximately 0.16 times the DC voltage, while the voltage on node 127 is approximately 0.1 times the DC voltage. When Q3 is on, the voltage on node 125 is less than the voltage on node 127.

The output signal of the comparator 128 drives the gate of Q1. Current from the adapter flows through the DC line 220 through the bypass resistor $R_{BP}$ or the transistor Q1 depending on whether Q1 is off or on. If Q1 is off, the current predominantly flows through $R_{BP}$. However, if Q1 is on, the source-to-drain resistance of Q1 is substantially lower than the resistance of $R_{BP}$ and thus, the current predominantly flows through Q1 instead of $R_{BP}$.

The operation of the delay circuit 120 will now be discussed. The first situation discussed is when the adapter 208 is plugged into an outlet and is on when the adapter plug 210 is mated to the computer's power receptacle 126. When the adapter plug 210 is not mated at all (neither partially nor fully) to the power receptacle 126 of the computer, the DC line 220 to which the delay circuit 120 couples is off and the delay circuit 120 is largely inoperative and de-energized. Once the adapter plug 210 is partially mated to the power receptacle 126 (DC and GND connected but not the ID signal), Q2 is forced off (i.e., continued to be forced off) via pull down resistor R2. In this state, transistor Q3 is forced on via its gate voltage as produced by the voltage divider combination of resistors R9 and R8. With Q3 forced on, the voltage on node 125 is forced be substantially lower than the voltage on node 127. With the comparator's non-inverting (+) input at a higher potential than its inverting (−) input, the output of the comparator is forced high. The $R_{BP}$ transistor is a PNP transistor in the embodiment illustrated in FIG. 4. As such, with the gate of Q1 at a high level, Q1 is off thereby causing most or all of the current from the adapter 208 to flow through $R_{BP}$, and not through Q1. The combination of $R_{BP}$ and the C150 (FIG. 2) functions to control the current flowing into the motherboard 150 and into the capacitance C150. The current level rises from 0 along a curve whose slope is determined, at least in part by the product of $R_{BP}$ and C150.

Once the adapter plug 210 is fully mated to power receptacle 126 (ID pin is connected), transistor Q2 turns on which causes Q3 to turn off. By this point in time, however, C150 has charged sufficiently, that Q1 can be safely turned on after a time delay without causing an inrush current problem as noted previously. While now in the fully connected state (DC, ID, and GND signal lines provided to the delay circuit 120), Q3 is off and the DC voltage 220 begins to charge capacitor C2 through resistor R4. The rate at which C2 charges is determined by the product of the capacitance of C2 and resistance of R4. The capacitance and resistance values of C2 and R4 are chosen to slow down the charge rate of C2 to a level that gives C150 a chance to fully (or nearly fully) charge. In some embodiments, C2 is 2.2 microfarads and, as noted previously, R4 is 73.2 kohms. The values chosen for C2 and R4 are such that the voltage on node 125 rises from about 0 (when Q3 was on in the partial connect state of the adapter plug 210) to a voltage greater than the voltage on node 127. At that point (when the voltage on node 125 becomes greater than the voltage on node 127), the output level of the comparator 128 changes from high to low. As a result of the comparator's output becoming low, PNP transistor Q1 turns on thereby causing current from the adapter 108 to flow through Q1 and not (or not much) through $R_{BP}$.

In FIG. 4, the capacitor C1 and resistor R3 are connected between the DC voltage and the gate of Q1. The parallel combination of C1 and R3 form a network to allow the gate of Q1 to follow the source (DC voltage) so that Q1 does not turn on during a rapid change in the DC voltage.

In the preceding situation, a user mates the adapter plug 210 to the computer's power receptacle 126 while the adapter is "hot" (i.e., already connected to a source of AC voltage by the time the adapter plug 210 is connected to the power receptacle 126). Another situation involves the user mating the adapter plug 210 to the computer's power receptacle 126 before the adapter 208 has been connected to an AC source. With the plug 210 already mated to receptacle 126, when the adapter 208 is connected to an AC source, the delay circuit 120 functions much the same as explained above. The adapter 208, however, controls the rise of the ID signal 222 as well as the DC voltage 220. Eventually, the voltage level of the ID signal 222 rises to a high enough level so as to turn on transistor Q2 and the delay circuit 120 functions from that point on as explained above.

In another situation, a user may disconnect and then quickly reconnect the adapter plug 210. As explained above, the delay circuit's time delay is caused, at least in part, by the charging of capacitor C2 which leads to an eventual change in the output level of comparator 128 (output becomes low because inverting input is greater than the non-inverting input) which, in turn, causes Q1 to turn on. Upon disconnecting the DC voltage 220, the charge on capacitor C2 will begin to dissipate. For a period of time following removal of DC voltage 220, the inverting input of the comparator 128 will still be higher than the non-inverting input and the transistor Q1 will remain on. During that period of time, if the user were to reconnect the adapter plug 210, the switch Q1 will still be on and the inrush current problem the delay circuit 120, transistor Q1 and resistor $R_{BP}$ avoid may be a problem. Essentially, the time delay implemented by the delay circuit 120 to turn on Q1 may prevent Q1 from being quickly reset as well.

The delay circuit 120 of the disclosed embodiments, however, avoids the quick disconnect and reconnect, current inrush problem. When a user begins to disconnect the adapter plug 210, the ID pin 216 (FIG. 3) breaks before the DC and GND breaks. During the brief period of time in which DC and GND connections are still made to the delay circuit 120, but the ID signal 222 is disconnected, DC voltage is provided to the delay circuit but the ID signal is removed. With the ID signal 222 removed, transistor Q2 turns off which causes transistor Q3 to turn on. With Q3 turned on, a low resistance path is provided through between the drain and source of Q3 to ground. Capacitor C2 thereby discharges quickly (e.g., in a matter of microseconds) through Q3 to ground. A human would be incapable of disconnecting the adapter plug 210 fast enough to prevent capacitor C2 from discharging through Q3 before the DC voltage is disconnected. With capacitor C2 discharged and transistor Q3 on, the voltage on node 125 becomes lower than the voltage on node 127. As result, the output of comparator 128 becomes high which forces transistor Q1 to be off.

The adapter's ID signal 222 is thus used to cause the delay circuit to rapidly reset (i.e., in much less time than the time delay associated with activating Q1). The ID signal is provided to the delay circuit via a connection mechanism (pin 216 and socket 134) that makes last and breaks first relative to the DC and GND voltage levels. The ID signal's last to make nature permits the delay circuit to charge C150 and implement a time delay before turning on Q1. The ID signal's first to break nature permits the delay circuit to rapidly reset by operation of transistors Q2 and Q3.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 an AC/DC adapter having a connector; and
 a portable computer that receives said connector, said portable computer comprising a delay circuit coupled to a power transistor coupled in parallel with a resistor, said delay circuit causes said power transistor to activate following a time delay after current from said AC/DC adapter begins to flow through said resistor;
 wherein, as a result of a user beginning to remove said connector from said portable computer, a control transistor is activated to reset said delay circuit.

2. The system of claim 1 further wherein, upon activation of the power transistor by the delay circuit, current bypasses said resistor and flows through said power transistor instead.

3. The system of claim 1 wherein said delay circuit receives an adapter identification signal from said AC/DC adapter, said adapter identification signal encoding information about said adapter, and said adapter identification signal also used to control said delay circuit.

4. The system of claim 3 wherein said connector comprises a first pin containing said adapter identification signal and a second pin containing a DC voltage to power said portable computer, and upon beginning to remove said connector from said portable computer, said first pin disconnects before said second pin disconnects.

5. The system of claim 4 wherein said delay circuit resets during removal of said connector in a time period between disconnection of said first pin and said second pin.

6. The system of claim 5 wherein said adapter identification signal causes said control transistor to activate during said time period to cause charge to be discharged from a capacitor in said delay circuit through said control transistor to thereby reset said delay circuit.

7. The system of claim 4 wherein said delay circuit comprises the control transistor that is activated based on said adapter identification signal.

8. A system, comprising:
 a chassis having a receptacle that receives a connector from an AC adapter, said system comprising a delay circuit coupled to a power transistor in parallel with a resistor, said delay circuit causes said power transistor to activate following a time delay after current from said adapter begins to flow through said resistor;
 wherein, as a result of a user beginning to remove said connector from said portable computer, a control transistor is activated to reset said delay circuit.

9. The system of claim 8 wherein, upon a user beginning to remove said connector, a first pin in said connector disconnects while power and ground pins in said connector remain connected thereby continuing to provide power to said system.

10. The system of claim 9 wherein a signal associated with said first pin causes said control transistor to be activated.

11. The system of claim 10 wherein said signal comprises an adapter identification signal that encodes information about said AC adapter.

12. The system of claim 8 wherein said delay circuit resets in a time period that is less than the time delay.

* * * * *

UNITED STATES PATENT AND TRADEMARK OFFICE
CERTIFICATE OF CORRECTION

PATENT NO. : 8,464,078 B2
APPLICATION NO. : 12/812483
DATED : June 11, 2013
INVENTOR(S) : Robert C. Brooks et al.

It is certified that error appears in the above-identified patent and that said Letters Patent is hereby corrected as shown below:

In the Claims:

In column 6, line 28, in Claim 2, delete "further wherein," and insert -- wherein, --, therefor.

Signed and Sealed this
Twenty-second Day of October, 2013

Teresa Stanek Rea
*Deputy Director of the United States Patent and Trademark Office*